Nov. 15, 1932.   J. S. TRITTON   1,887,828
LAMP CONTROL FOR VEHICLES
Filed Sept. 3, 1931   2 Sheets-Sheet 1

INVENTOR:-
J. S. TRITTON.
PER:- Sydney E. Page
ATTORNEY

Nov. 15, 1932.  J. S. TRITTON  1,887,828
LAMP CONTROL FOR VEHICLES
Filed Sept. 3, 1931  2 Sheets-Sheet 2
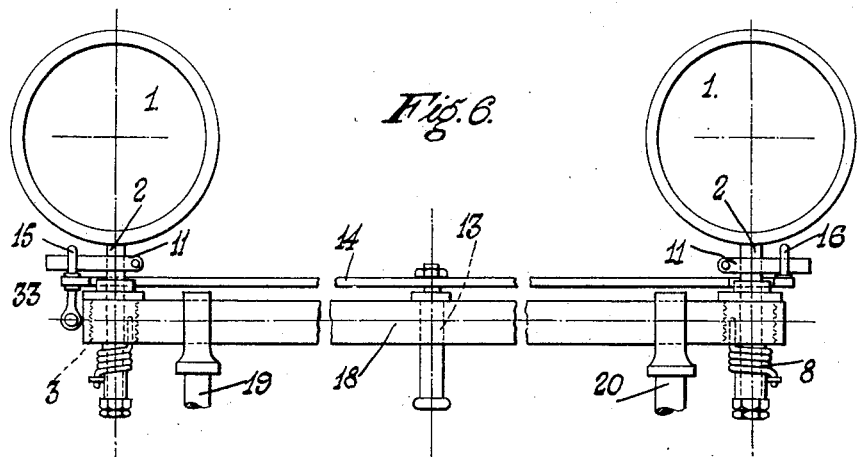
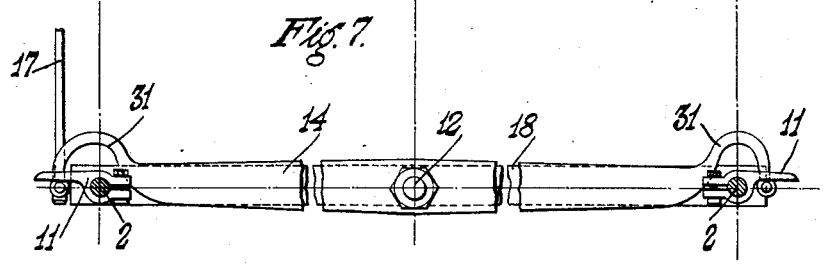
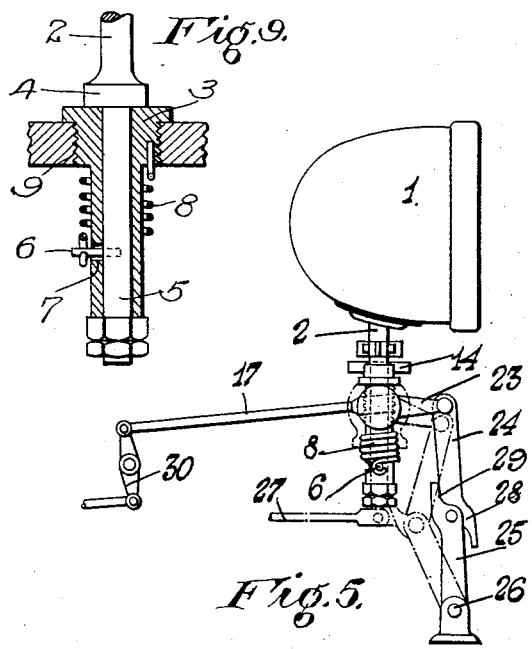
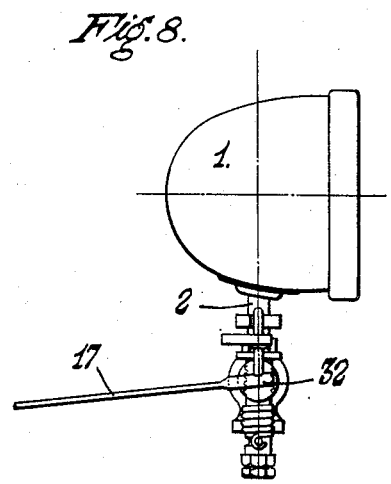
INVENTOR:-
J. S. TRITTON
PER:- Sydney E. Page
ATTORNEY.

Patented Nov. 15, 1932

1,887,828

UNITED STATES PATENT OFFICE

JULIAN SEYMOUR TRITTON, OF CALCUTTA, INDIA

LAMP CONTROL FOR VEHICLES

Application filed September 3, 1931, Serial No. 561,025, and in Great Britain September 16, 1930.

This invention relates to swivelling apparatus for a pair of vehicle head lamps disposed one each side of the vehicle for the purpose of giving a more effective illumination when turning corners, and under any other conditions.

With lamps as at present in use which only throw a straight beam forward, a defect is experienced in that they do not illuminate the off or the near-side of the road until almost completely round the corner, according as a car is turning to the right or the left, and in order to overcome this disadvantage it has heretofore been proposed to allow one lamp of a pair which normally illuminates one side of the road to maintain its normal illumination, and to cause the second lamp to be moved so as to illuminate a line other than it would normally illuminate when acting as a fixed lamp. Thus according as to which direction the car is turned one of the lamps remains stationary, while the other is turned in the same direction as the vehicle.

The apparatus necessary to obtain this result has heretofore been somewhat comparatively complicated and expensive, and it is the object of the present invention to simplify the method and apparatus, and to improve the efficacy thereof.

A further object of the invention is to provide improved dipping apparatus to be associated with the lamp swivelling apparatus, but capable of being operated independently thereof, and when the swivelling apparatus is in normal or zero position without affecting incorrect rotation of the lamps.

In a preferred method according to this invention, when the vehicle is turned either to the right or to the left, the corresponding lamp is arranged to be swivelled with the other lamp remaining stationary. This arrangement allows of the inner side of the curve to be effectively illuminated and the boundary of the road as the vehicle is turned to be sufficiently illuminated, so that objects can be clearly defined.

The essential feature of the present invention is a single pivotal bar, which is located between the lamps and has its ends freely engaging projecting arms on the lamps, this bar being connected to the steering mechanism of the vehicle so that when the latter negotiates a turn the bar is rotated in a particular direction. Consequently, one of the ends of the bar will abut the arm on one lamp and cause the latter to turn with a harmonic or differential movement, while the other end will rotate away from the other lamp leaving it stationary in the initial position. When the arms project laterally either toward one another or away from one another, the differential movement will be such as to produce a reduced rate of turning of a lamp towards the latter stages of the turning.

Thus, at the commencement of a turn the appropriate lamp will move more quickly than the wheels, whilst as the steering mechanism approaches full lock the speed of rotation of the lamp will progressively decrease.

Each lamp is controlled by a spring member which normally maintains the lamp against a stop in the stationary, straight ahead position, and returns it to this position when the pivotal bar has been restored after operating the lamp.

The invention is preferably applied to motor vehicles, but it should be understood that the invention is also applicable to any vehicle constructed with steering apparatus which may be turned so that the lamps anticipate the movement of the vehicle.

As hereinbefore mentioned, the invention also embodies apparatus for dipping the lamps which is associated with the swivelling apparatus but may be operated independently thereof as desired.

Accordingly the lamps are preferably supported on a transverse shaft hereinafter termed a dipping shaft, which is capable of rotation in fixed bearings secured to the chassis of the vehicle, the dipping shaft also carrying the pivotal bar member.

To prevent the dipping motion producing swivelling of the lamps, more particularly in the zero or normal position thereof, the end of the connecting rod for actuating the pivotal bar from the steering is connected in the axis of the dipping shaft.

The invention will be more clearly understood with reference to the following description taken in conjunction with the accompanying drawings, which show by way of example two embodiments of the invention as applied to the control of a pair of lamps.

In the drawings:—

Fig. 5 is an end elevation of Fig. 3 and illustrates more clearly the dipping mechanism and the control of the swivelling apparatus by a pull rod;

Fig. 6 is a modified combined swivelling and dipping mechanism in which a reversing mechanism is eliminated and the supports on the dipping shaft are placed intermediate of the lamps instead of externally thereof as shown in Fig. 3;

Fig. 7 is a plan view of Fig. 6 with the lamps removed;

Fig. 8 is a side elevation of Fig. 6 showing the connecting rod of the mechanism actuating the swivelling apparatus connected to the pivotal bar in the axis of the dipping shaft;

Fig. 9 is a detail view of one form of bearings for the lamp stems and the preferred means employed for restoring to and maintaining a lamp in the normal or straight ahead position.

Figure 1:
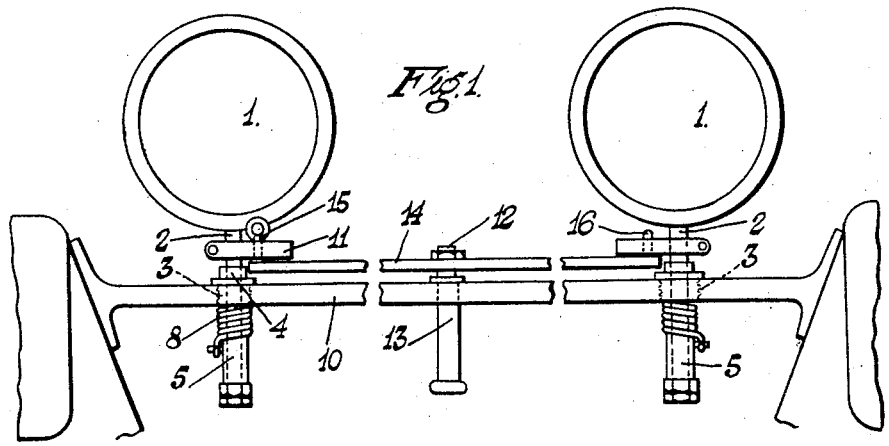
Fig. 1 is a diagrammatic view, looking from the front of the vehicle, of one form of the mechanism according to the invention without dipping gear.

The lamps 1 are mounted in any convenient manner on stems or spindles 2 which in turn are rotatably mounted in flanged support bearings 3 and maintained in position by collars 4 abutting against the flanged ends of the bearings.

A convenient form of support bearing for a lamp which incorporates a spring member for maintaining and returning the lamp to a predetermined position may be of the form as shown in Fig. 9, wherein each bearing 3 is provided with a sleeve 5 in which the lamp stem 2 is mounted. A small pin 6 on the lamp stem is arranged to project through a circumferential slot 7 in the sleeve 5 and a helical spring 8 surrounds the sleeve 5, being fixed at one end to a flanged and threaded enlarged end 9 of the sleeve 5 and attached at its other end to the pin 6 riding in the circumferential slot 7. The pin 6 normally abuts against one end of the slot 7 under pressure from the spring, to thereby maintain the lamp in the normal or straight ahead position when the bearing 3 is screwed into the cross bar 10 supporting the lamps.

It will be understood, however, that the lamp support bearing described above is by way of example only, and may be modified according to requirements, and further the bearing instead of being screwed into the cross bar may be welded thereon, or may be clipped to or mounted on lugs attached to the bar.

Figure 2:
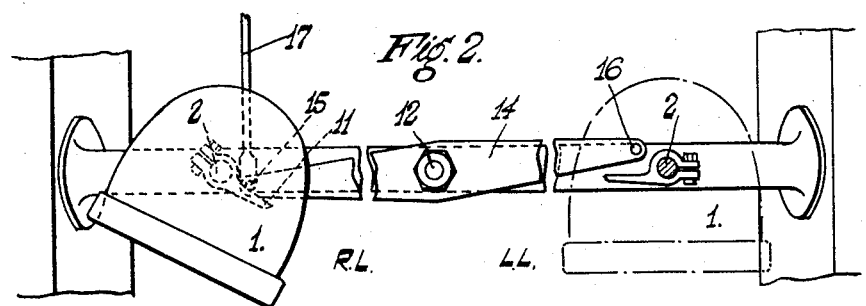
Fig. 2 is a plan view of Fig. 1 showing the position of the parts with the right hand lamp actuated.

In the simplest form of the invention apparatus for dipping the lamps is not provided, and accordingly in one construction as shown in Figs. 1 and 2, the cross bar 10 will be made as a rigid fixture at the front of the vehicle. This bar, when the vehicle is a motor car, may be conveniently the usual cross stay between the front wings of the chassis of the car. The lamps 1 are each mounted in position at the respective sides of the car by securing the bearings 3 thereof into the cross stay as described above.

Referring now to Figs. 1 to 8 and first more particularly to Figs. 1 and 2, a single bar 14 is pivoted centrally of the two lamps and rigidly secured to each of the lamp stems, preferably above the collars 4 as shown, is a laterally projecting arm or finger 11 which, in the normal straight ahead position of the associated lamp, points inwardly along the cross bar towards the other lamp.

Fixedly mounted intermediate of the two lamps 1 on the cross bar 10 is a further bearing 13, in which is rotatably mounted a pin 12 carrying the pivotal bar 14 the ends of which bar include vertical pins 15, 16 freely engaging with the projecting fingers 11, so as to wipe the inner sides of the said fingers with the result that as the bar 14 is rotated one lamp will be turned differentially and at a rate which progressively decreases towards the latter stages of the turn, while the other lamp remains stationary by reason of the end of the bar moving away from the associated finger.

It will be understood, however, that these pins are not essential, since the fingers could be arranged to engage directly with extensions on the ends of the pivotal bar, or the latter may be mounted in the same plane as the fingers, which would then co-operate directly with the ends of the pivotal bar.

Preferably a reciprocating connecting rod 17 controlled from the steering mechanism is connected by a ball or universal joint, to one end of the pivotal bar 14, preferably the right hand or off-side end, and is arranged to produce an angular movement of the pivotal bar, and consequently a reciprocating motion at either end of the latter in accordance with the movement of the steering mechanism, the pivotal bar 14 in its normal position being arranged with its horizontal axis parallel to the axis of the cross stay 10.

As previously mentioned, according to the preferred method, the lamps 1 are arranged to be operated in such a manner that when the car is turned to the right, the right hand lamp RL rotates, and the left hand lamp LL remains stationary, while when the car is turned to the left, the left hand lamp LL rotates and the right hand one remains in a straight ahead position. Consequently, in order that the correct lamp may be rotated, it is necessary to arrange that when the car is turned to the right, the connecting rod 17 controlling the angular movement of the pivotal bar 14 is moved forwardly while when the car is turned to the left, the rod 17 is moved backwardly.

Thus, forward movement of the rod 17 causes the finger 11 of the right hand lamp RL to rotate in clockwise direction as viewed in Fig. 2, and thereby rotation of the associated lamp in the same direction. The right hand lamp will, therefore, illuminate the off-side of the road and the left hand lamp will remain stationary, the parts being disposed as shown in Fig. 2.

Turning of the car to the left results in the connecting rod 17 being moved backwards and the left hand pin 16 causing the finger 11 of the left hand lamp LL to be rotated in a counter-clockwise direction to cause corresponding rotation of the associated lamp, and illumination of the near side of the road, the right hand lamp RL remaining stationary.

It will be understood, therefore, that forward movement of the connecting rod causes the left hand pin to move away from the finger of the left hand lamp LL, while backward movement of the connecting rod causes the right hand pin to move away from the finger of the right hand lamp RL, the lamp which is not to be rotated being maintained in the straight ahead position by virtue of the spring 8 on the associated bearing 3.

Rotation of the lamps is allowed by the slots 7 in the sleeves 5 of the bearings 3, in which slots ride the pins 6 on the lamp stems 2, tension being stored up in the spring 8 of the operated lamp so that when the pivotal bar 14 is restored to its zero position parallel with the cross bar 10, the operated lamp is also restored by the spring 8, the associated pin 6 abutting against the forward end of the slot 7 when the normal or straight ahead position of the lamp is reached.

Since, therefore, the pins 6 are normally maintained against the forward end of the slots 7 in the respective bearings of the lamps, it will be understood that when either lamp is rotated the other lamp is prevented from rotation, and is maintained in a direction parallel to the longitudinal axis of the car.

It will be understood however, that this arrangement of restoring to and maintaining the lamps in a predetermined position is capable of modification, and the invention is not to be considered limited to the preferred embodiment.

For example, the pin riding in the slot in the bearing of the lamp, together with the slot, could be dispensed with, and a fixed pin, preferably on the cross stay, provided secured in such a position that the finger 11 on the lamp spindle 2 engages therewith in the normal position under spring pressure.

To provide for the dipping of the lamps, the cross bar 10 is constituted by a shaft 18 which is rotatably mounted in fixed bearings secured, for example, to the chassis of the car.

Figure 3:
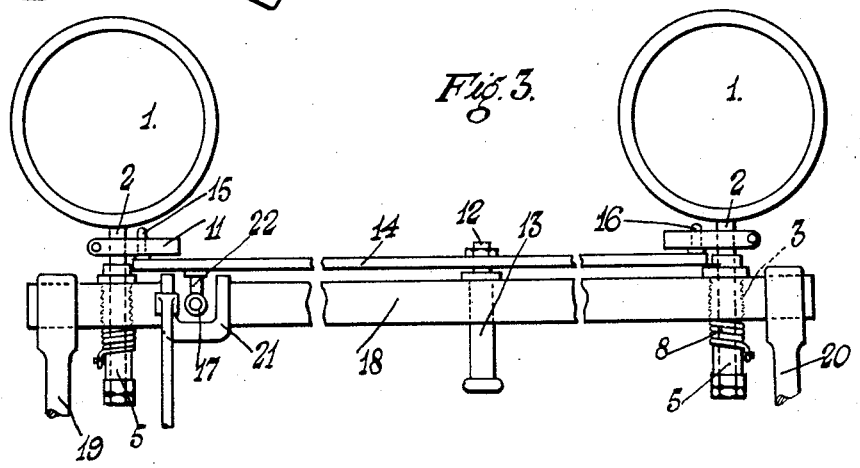
Fig. 3 is a modified arrangement in which dipping mechanism is associated with the swivelling apparatus.
Figure 4:
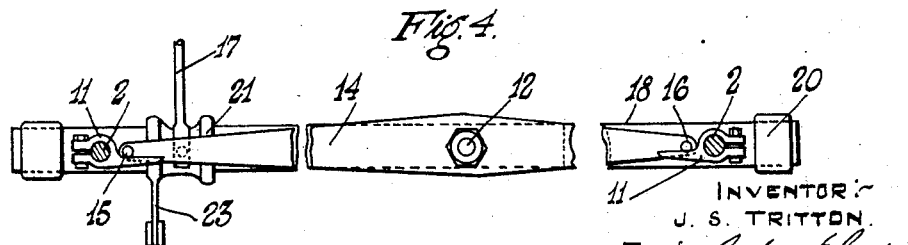
Fig. 4 is a plan view of Fig. 3 with the lamps removed.

In one construction according to Figs. 3, 4 and 5 embodying this modification, the lamps 1 are each mounted as before in bearings 3 and are provided with similar means for restoring to and maintaining them in the straight ahead position, a projecting finger 11 being also similarly secured to each lamp spindle 2. The pivotal bar 14 is as before mounted in a bearing 13 intermediate of the lamps 1 and is provided at each end with similar pins 15, 16 which abut against the respective inner sides of the fingers 11 of the two lamps.

In order that the dipping motion of the lamps may not affect the swivelling motion, the end of the connecting rod 17 is arranged to be brought into the horizontal axis of the dipping shaft 18. This is accomplished by forming the dipping shaft 18 with a slot or recess intermediate of the two lamps, and suitably reinforcing the bar at this point. Conveniently a U shaped member 21 may be formed in the bar, between the jaws of which the end of the rod 17 is connected in the centre line of the dipping shaft, by means of a ball or universal joint to a pin or extension 22 on the pivotal bar 14, depending into the slot or U shaped member 21.

Attached to the dipping shaft 18 is a lever 23 preferably formed as an extension of one of the jaws of the U shaped member. This lever 23 is connected by toggle mechanism comprising a pair of toggle levers 24 and 25, to a rigid pin 26 attached to a convenient part of the chassis or any other fixed point. A pull rod 27 is secured to one of the toggle levers preferably at the hinge of the toggle and is operatively connected such as by Bowden cable to suitable control mechanism operable by the driver of the car.

Backward movement of this pull rod 27 will bring the toggle mechanism into the position shown in dotted lines in Fig. 5, thereby rotating the shaft 18 downwardly and causing the beam from the lamps to dip. Suitable means, such as a spring, not shown, being provided for returning the dipping shaft to normal position when the control mechanism is released.

Limiting stops 28 and 29 are preferably provided for limiting the backward and forward movement of the toggle levers 24, 25, these stops respectively being conveniently formed as extension lugs on the ends of the respective toggle levers 24 and 25.

In Fig. 5 the connection of the pull rod 27 to the toggle mechanism is shown only in the dotted portion of the latter for the sake of clearness.

As previously described, the movement of the pivotal bar 14 is effected by a connecting rod 17 controlled from the steering mechanism, and it is necessary that movement of the connecting rod in a forward direction produced rotation of the right hand lamp, while movement of the connecting rod in a backward direction produces rotation of the left hand lamp, according as to whether the car is turned to the right or the left.

To effect this movement the connecting rod 17 may correspond to the connecting rod 20 of British Patent Specification No. 278,464, and may be controlled from the steering column by the transmission mechanism for actuating the swivelling apparatus therein described and shown, with the exception that it will be necessary to interpose a reversing link such as 30 whereby the correct movement is given to the rod 17 when the car is turned.

It will be understood, however, that other transmission mechanism for effecting the necessary movement of the lamps in accordance with the steering may be employed, or any alternative means which will produce correct reciprocation of the ends of the pivotal bar 14 when the steering gear is operated.

According, however, to a further modification of the invention, in which both dipping and swivelling movement of the lamps is preferably provided, although the dipping apparatus is not necessary thereto, the pivotal bar 14 is so formed or constructed that the provision of a reversing link 30, or the like, is unnecessary, so that when the car is turned either to the right or to the left rotation of the correct lamp ensues.

In this modification as illustrated in Figs. 6, 7 and 8, the pins 15, 16 on the pivotal bar 14 are mounted thereon on the further side of the lamp spindles 2 from the pivot point, and therefore rotate the fingers 11 in the opposite sense. The pivotal bar 14 is provided with curved ends 31, which respectively pass beyond and embrace the lamp spindles 2, the vertical pins 15, 16 being secured to the respective ends 31 preferably near the extremities thereof and co-operating with the fingers 11 on the lamps, which in this case, however, are mounted in such a manner that they point in a direction away from each other. The pins 15, 16 on the pivotal bar 14 in this case abut against the outer faces of the fingers. If necessary, the pivot point of the pivotal bar may be offset from the axis of the transverse shaft.

Preferably the connecting rod 17 controlled from the steering mechanism, is connected in the axis of the dipping shaft 18 by means of a ball or universal joint 32 to a depending pin or extension 33 at the right hand end of the pivotal bar 14, whereby the rod 17 is caused to reciprocate across the axis of the dipping shaft 18 to ensure that no relative movement of the pivotal bar 14 occurs when dipping of the lamps is effected, more particularly in the zero or normal position of the bar 14.

Dipping apparatus similar to that described in connection with the previous modification may be attached to the dipping shaft 18 in any convenient manner, for example, by a similar outwardly extending lever 23 provided on a longitudinal extension of the dipping shaft 18 or intermediate of the lamps.

With this arrangement, if the movement of the connecting rod 17 controlled from the steering mechanism is normally in a backward direction when the car is turned to the right, and forwardly when the car is turned to the left, it will be seen that rotation of the correct lamp is effected. Thus, when the car is turned to the right, the connecting rod 17 moves backwards to cause the finger 11 on the right hand lamp RL to rotate in a clockwise direction, and when the car is turned to the left the finger 11 on the left lamp LL is rotated in the same direction; it will, therefore, be possible to directly connect the rod 17 with transmission mechanism such as that shown and described in British Specification No. 278,464.

It will be understood that any convenient means may be provided for effecting reciprocation of the ends of the pivotal bar, so long as the reciprocation is effected in accordance with the movement of the steering mechanism and the correct lamp rotated.

Further, it will also be understood that by causing the pins on the ends of the pivotal bar to abut against the other side of the fingers on the lamp spindles, turning of the car either to the right or the left will cause either the left or the right hand lamp to rotate in the direction turned, so that the lamp which normally would illuminate the outer side of the curve is swivelled so as to illuminate the inner side of the road or track, while the other lamp remains stationary.

It will be seen, therefore, that with the swivelling and dipping arrangements according to this invention, considerable economy has been effected over the constructions previously proposed, together with the simplification of the working parts in order to improve the efficacy and maintenance of the device.

I claim:—

1. Swivelling apparatus for a pair of vehicle head lamps disposed one on each side of the vehicle with restoring means for returning the lamps to initial position, the vehicle including steering mechanism, comprising in combination with a pair of projecting arms one for each lamp, a single pivotal bar, means for mounting the bar between the lamps with the ends of the said bar freely engaging the said arms and connecting means for rotating the said bar from the steering mechanism of the vehicle in accordance with direction turned.

2. Swivelling apparatus for a pair of vehicle head lamps disposed one on each side of the vehicle with restoring means for returning the lamps to initial position, the vehicle including steering mechanism, comprising in combination with a pair of laterally projecting arms, one for each lamp, a single pivotal bar, means for mounting the bar between the lamps with the end of said bar freely engaging the said laterally projecting arms, so as to produce a reduced rate of turning of a lamp towards the latter stages of the turning, and connecting means for rotating the said bar from the steering mechanism of the vehicle in accordance with the direction turned.

3. Swivelling apparatus for a pair of vehicle head lamps, the vehicle including steering mechanism, a dipping shaft carrying the said lamps one on each side of the vehicle with restoring means for returning the lamps to initial position, and means for rotating the dipping shaft, comprising in combination with a pair of projecting arms one for each lamp, a single pivotal bar, means for mounting the bar on the dipping shaft between the lamps with the ends of the said bar freely engaging the said arms; connecting means for rotating the said bar from the steering mechanism of the vehicle in accordance with the direction turned, and means for disposing the connection between the said connecting means and the said bar, in the axis of the dipping shaft.

4. Swivelling apparatus for a pair of vehicle head lamps, the vehicle including steering mechanism, a dipping shaft carrying the said lamps one on each side of the vehicle, with restoring means for returning the lamps to initial position, and means for rotating the dipping shaft, comprising in combination with a pair of laterally projecting arms, one for each lamp, a single pivotal bar, means for mounting the bar on the dipping shaft between the lamps with the ends of the said bar freely engaging the said laterally projecting arms, so as to produce a reduced rate of turning of a lamp towards the latter stages of the turning, connecting means for rotating the said bar from the steering mechanism of the vehicle in accordance with direction turned, and means for disposing the connection between the said connecting means and the said bar in the axis of the dipping shaft.

5. In a vehicle including a chassis and steering mechanism, the combination of a pair of lamps, a pair of supports mounted one on each side of the chassis, lamp spindles to the lamps rotatably mounted in said supports, restoring means for returning the lamps to initial position when turned, an arm on each lamp spindle projecting inwardly toward the other, a bearing mounted on the chassis between the lamps, a single bar pivoted centrally between the lamps in the said bearing with the ends of the said bar freely engaging the said inwardly projecting arms; and a reciprocating rod connecting the said bar with the steering mechanism for rotating the bar in accordance with the direction steered.

6. In a vehicle including a chassis and steering mechanism, the combination of a pair of lamps, a pair of supports mounted one on each side of the chassis, lamp spindles to the lamps rotatably mounted in said supports, restoring means for returning the lamps to initial position when turned, an arm on each lamp spindle projecting outwardly away from the other, a bearing mounted on the chassis between the lamps, a single bar pivoted centrally between the lamps in the said bearing, curved ends to said bar embracing the lamp spindles and freely engaging the said outwardly projecting arms, and a reciprocating connecting rod connecting the said bar with the steering mechanism for rotating the bar in accordance with the direction steered.

7. In a vehicle including a chassis and steering mechanism the combination of a dipping shaft rotatably mounted on the chassis, a pair of lamps, a pair of lamp supports mounted one on each side of the dipping shaft, lamp spindles to the lamps, rotatably mounted in said supports, restoring means for returning the lamps to initial position when turned, an arm on each lamp spindle projecting inwardly toward the other, a bearing mounted on the dipping shaft between the lamps, a single bar pivoted centrally between the lamps in the said bearing with the ends of the said bar freely engaging the said inwardly projecting arms, means for rotating the dipping shaft, a reciprocating connecting rod extending to the steering mechanism for reciprocation thereby according to the direction steered, an extension to said bar on one side of the pivot thereof, the said extension depending into a recess in the said shaft and an operative connection between the said extension and one end of the connecting rod in the horizontal axis of the dipping shaft.

8. In a vehicle including a chassis and steering mechanism the combination of a dipping shaft rotatably mounted on the chassis, a pair of lamps, a pair of lamp supports mounted one on each side of the dipping shaft, lamp spindles to the lamps rotatably mounted on said supports, restoring means for returning the lamps to initial position when turned, an arm on each lamp spindle projecting outwardly away from the other, a bearing mounted on the dipping shaft between the lamps, a single bar pivoted centrally between the lamps in the said bearing, curved ends to the said bar embracing the lamp spindles and freely engaging the said outwardly projecting arms, means for rotating the dipping shaft, a reciprocating connecting rod extending to the steering mechanism for reciprocation thereby according to the direction steered, and means for connecting one end of the connecting rod to the said bar on one side of the pivot thereof in the horizontal axis of the dipping shaft.

9. In a vehicle including a chassis and steering mechanism the combination of a dipping shaft rotatably mounted on the chassis, a pair of lamps, a pair of lamp supports mounted one on each side of the dipping shaft, lamp spindles to the lamps rotatably mounted on said supports, restoring means for returning the lamps to initial position when turned, an arm on each lamp spindle projecting outwardly away from the other, a bearing mounted on the dipping shaft between the lamps, a single bar pivoted centrally between the lamps in the said bearing, curved ends to the said bar embracing the lamp spindles, and freely engaging the said outwardly projecting arms, means for rotating the dipping shaft, a reciprocating connecting rod extending to the steering mechanism for reciprocation thereby according to the direction steered, a depending extension on one of said ends and an operative connection between the said connecting rod and the extension in the horizontal axis of the dipping shaft.

In testimony whereof I affix my signature.

JULIAN S. TRITTON.